United States Patent
Fujii et al.

(10) Patent No.: US 9,403,562 B2
(45) Date of Patent: Aug. 2, 2016

(54) MOVING BODY SIDE SECTION STRUCTURE

(75) Inventors: Narito Fujii, Izunokuni (JP); Masaaki Morimoto, Susono (JP); Koshi Yamada, Odawara (JP); Nagataka Sassa, Susono (JP); Naohiko Saito, Kanagawa (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 241 days.

(21) Appl. No.: 13/696,463

(22) PCT Filed: Apr. 28, 2011

(86) PCT No.: PCT/JP2011/060465
§ 371 (c)(1),
(2), (4) Date: Jan. 22, 2013

(87) PCT Pub. No.: WO2011/138931
PCT Pub. Date: Nov. 10, 2011

(65) Prior Publication Data
US 2013/0119703 A1 May 16, 2013

(30) Foreign Application Priority Data
May 7, 2010 (JP) ................ P2010-107560

(51) Int. Cl.
*B62D 35/00* (2006.01)
(52) U.S. Cl.
CPC .............. *B62D 35/00* (2013.01); *B62D 35/008* (2013.01)
(58) Field of Classification Search
CPC ..... B62D 35/007; B62D 35/00; B62D 35/008
USPC ....................................... 296/180.1
See application file for complete search history.

(56) References Cited

U.S. PATENT DOCUMENTS

| | | | |
|---|---|---|---|
| 3,522,584 A * | 8/1970 | Talbot | 362/494 |
| 5,988,568 A * | 11/1999 | Drews | B64C 21/10 244/130 |
| 6,712,413 B1 * | 3/2004 | Flowerday | 296/1.11 |
| 2003/0026008 A1 | 2/2003 | Tanaka | |
| 2011/0095562 A1 | 4/2011 | Yamagishi et al. | |

FOREIGN PATENT DOCUMENTS

| | | |
|---|---|---|
| JP | 61-205832 U | 12/1986 |
| JP | 10-114258 A | 5/1998 |
| JP | 2001050215 A | 2/2001 |
| JP | 2002-293188 A | 10/2002 |
| JP | 2003-112573 A | 4/2003 |

(Continued)

*Primary Examiner* — Glenn Dayoan
*Assistant Examiner* — Melissa A Black
(74) *Attorney, Agent, or Firm* — Sughrue Mion, PLLC

(57) ABSTRACT

In a moving body side section structure that includes a flow correction fin 1A that is provided on a side section of a moving body, the flow correction fin includes a first inclined portion 1Ae which is formed at a front end in the longitudinal direction of the moving body and in which a width in a width direction of the moving body is widened toward a rear side in the longitudinal direction of the moving body, and a second inclined portion 1Af which is formed further rearward than the first inclined portion 1Ae in the longitudinal direction of the moving body and in which the width in the width direction of the moving body is narrowed toward the rear side in the longitudinal direction of the moving body.

9 Claims, 7 Drawing Sheets

(56) References Cited

FOREIGN PATENT DOCUMENTS

| JP | 2004-210138 A | 7/2004 |
| JP | 2004-345562 A | 12/2004 |
| JP | 3132090 U | 5/2007 |
| JP | 2009-90681 A | 4/2009 |

* cited by examiner (a)

(b)

(a)

(b)

(a)

(b)

(a)

(b)

(c)

(a)

(b)

(a)

(b)

MOVING BODY SIDE SECTION STRUCTURE

CROSS REFERENCE TO RELATED APPLICATIONS

This application is a National Stage of International Application No. PCT/JP2011/060465, filed on Apr. 28, 2011, and claims priority based on Japanese Patent Application No. 2010-107560, May 7, 2010, the contents of all of which are incorporated herein by reference in their entirety.

TECHNICAL FIELD

The present invention relates to a moving body side section structure.

BACKGROUND ART

In general, an airstream around a vehicle body during traveling of a vehicle may be separated (may be away from the vehicle body) or disturbed according to the vehicle body structure. If a mainstream (the strongest and fastest flow) of the airstream is far away from the vehicle body (if the boundary layer is thickened), the aerodynamic force (air restraining force) with respect to a vehicle is decreased. If the space in which the aerodynamic force is weak is increased, the vehicle becomes unstable. In Patent Literature 1, it is disclosed that a flow correction fin is provided on the lower portion of a vehicle body, the flow of fluid at the lower portion of a vehicle is corrected due to the flow correction fin and speed of the flow is increased, and stability of the vehicle is improved. In addition, in Patent Literature 5, it is disclosed that a convex bump is provided at the rear end portion of the roof of a vehicle, and thereby, air resistance of a vehicle body is decreased.

CITATION LIST

Patent Literature

[Patent Literature 1] Japanese Unexamined Patent Application Publication No. 2009-90681
[Patent Literature 2] Japanese Unexamined Patent Application Publication No. 2004-210138
[Patent Literature 3] Japanese Unexamined Patent Application Publication No. 2003-112573
[Patent Literature 4] Japanese Unexamined Patent Application Publication No. 2002-293188
[Patent Literature 5] Japanese Unexamined Patent Application Publication No. 2004-345562

SUMMARY OF INVENTION

Technical Problem

However, the vehicle body structure varies according to the kind of vehicle, and the flow correction fin may not be provided on the lower portion of the vehicle body unlike the above-described vehicle body. In addition, it is necessary to correct the flow at the upper portion side of the vehicle body and improve stability. However, as described in Patent Literature 1, the structure in which the flow correction fin is provided on the lower portion of the vehicle body is a shape which is most suitable to the lower portion structure of the vehicle body, and the structure of Patent Literature 1 cannot be provided on the upper portion of the vehicle body. Moreover, in the above-described Patent Literature 5, since the convex bump is provided on the roof, when the vehicle is subjected to a side wind during traveling, or the like, the side wind strikes the bump, and thereby, there is a concern that the stability (particularly, steering performance) of the vehicle may be decreased.

Therefore, an object of the present invention is to provide a moving body side section structure capable of correcting the flow of fluid on the upper portion of a moving body and improving stability of the moving body.

Solution to Problem

In a moving body side section structure according to an aspect of the present invention that includes a flow correction fin that is provided on a side section of a moving body and corrects a flow of fluid of the side section of the moving body, the length of the flow correction fin in a longitudinal direction of the moving body is set so as to be longer than the length of the fin in a vertical direction of the moving body, the flow correction fin includes: a first inclined portion which is formed at a front end portion in the longitudinal direction of the moving body and in which a width in a width direction of the moving body is widened toward a rear side in the longitudinal direction of the moving body; and a second inclined portion which is formed further rearward than the first inclined portion in the longitudinal direction of the moving body and in which the width in the width direction of the moving body is narrowed toward the rear side in the longitudinal direction of the moving body.

The moving body side section structure includes the flow correction fin that is provided on the side section of the moving body. The length of the flow correction fin in the longitudinal direction of the moving body is set to be longer than the length of the fin in the vertical direction of the moving body in a state where the flow correction fin is provided on the side section of the moving body, and the longitudinal direction of the moving body becomes the longitudinal side. Moreover, the flow correction fin includes the first inclined portion and the second inclined portion. The first inclined portion is an inclined portion which is formed at the front end portion in the longitudinal direction of the moving body and in which the width in the width direction of the moving body is widened toward the rear side and rises from the front end portion side to the second inclined portion side. The second inclined portion is an inclined portion which is formed further rearward than the first inclined portion in the longitudinal direction of the moving body and in which the width in the width direction of the moving body is narrowed toward the rear side and the rear end portion side lowers from the first inclined portion side. The first inclined portion and the second inclined portion may be a straight line or a curved line, and the first inclined portion and the second inclined portion may be formed so as to be continuous, or may interpose a portion parallel in the longitudinal direction so as to be non-continuous. If the flow correction fin having the above-described shape is provided on the side section of the moving body, the flow of the fluid in the vicinity of the flow correction fin can be corrected, and the flow speed in the vicinity of the flow correction fin or at the rear side of the fin can be increased. As a result, a mainstream (the fastest flow of the fluid) in the vicinity of the moving body approaches the moving body, stability of the moving body during movement of the moving body is improved, and air resistance is decreased. In this way, in the moving body side section structure, the flow correction fin having the above-described shape is provided on the side section of the moving body, and thereby, the flow of the fluid at the upper portion of the moving body can be corrected due to the effects of the flow correction fin, and stability of the moving body can be improved. Moreover, since the flow correction fin is provided on the side section of the moving body, the moving body side section structure is not subjected to influence due to a side wind, flow correction effects can be exhibited, and stability of the moving body can be improved. In addition, the upper portion of the moving body is positioned further upward than the bottom portion of the moving body and includes the side section of the moving body. The front end portion includes not only the forefront portion of the moving body but also a portion of the front end side of moving body.

In the moving body side section structure according to the aspect of the present invention, the flow correction fin may include a ridge line that connects a front end portion and a rear end portion in the longitudinal direction of the moving body. In the moving body side section structure, since the flow correction fin is formed so as to include the ridge line from the front end portion to the rear end portion, flow correction effects or speed increasing effects due to the flow correction fin can be further improved. Particularly, in the moving body side section structure of the present invention, a radius of the ridge line may be 0 to 4.0 mm.

In the moving body side section structure according to the aspect of the present invention, the flow correction fin may include a third inclined portion in which the width in the vertical direction of the moving body is narrowed toward the rear side in the longitudinal direction of the moving body. Since the moving body side section structure includes a third inclined portion in which the width in the vertical direction of the moving body is narrowed toward the rear side, flow correction effects or speed increasing effects due to the flow correction fin can be further improved.

In the moving body side section structure according to the aspect of the present invention, an inflection portion that is formed so as to be steeply raised with respect to a side surface of the moving body in a plan view of the moving body may be set at the rear end portion of the flow correction fin. In the moving body side section structure, since the inflection portion is provided on the rear end portion of the flow correction fin, flow correction effects or speed increasing effects due to the flow correction fin can be further improved. There is an effect if the inflection portion is formed so that the rear end of the flow correction fin has an angle within a range of 45° to 90° from the side surface of the moving body, and the effect is the largest if the inflection portion is formed so that the rear end has the angle of 90° from the side surface of the moving body.

In the moving body side section structure according to the aspect of the present invention, the moving body may be a vehicle, and the flow correction fin may be provided on a portion of a side section of a vehicle body between a side mirror and the vehicle body. In the moving body side section structure, since the flow correction fin is provided on the portion of the vehicle body side section between the side mirror of the vehicle and the vehicle body, effects due to the flow correction fin can be obtained, the flow of fluid in the vicinity of pillar A is corrected, and the flow speed of the fluid can be increased. Therefore, steering performance (particularly, fine steering response) and the like can be improved.

In the moving body side section structure according to the aspect of the present invention, the moving body may be a vehicle, and the flow correction fin may be provided on a rear combination lamp. In the moving body side section structure, since flow correction fin is provided on a rear combination lamp of a vehicle, effects due to the flow correction fin can be obtained, convergence of an airflow in the rear end portion (an airflow discharging portion in the vicinity of the vehicle body) of the vehicle body can be promoted, and the flow speed of the fluid can be increased. Therefore, rear stability performance or the like can be improved.

In the moving body side section structure according to the aspect of the present invention, in the flow correction fin, a maximum width position in the vertical direction of the moving body and the width direction of the moving body may be set at a front side of the moving body. In the moving body side section structure, since the flow correction fin is formed so that the maximum width position is positioned at the front side (further to the front side than the center) of the moving body, flow correction effects or speed increasing effects due to the flow correction fin can be further improved.

In the moving body side section structure according to the aspect of the present invention, in the flow correction fin, a ratio between a length from the front end in the longitudinal direction of the moving body to the maximum width position in the vertical direction of the moving body and a length in the longitudinal direction of the moving body in a side view of the moving body may be 30 to 50%. In the moving body side section structure, since the flow correction fin is formed so that the ratio between the length from the front end to the maximum width position in the vertical direction of the moving body and the length in the longitudinal direction of the moving body is 30 to 50%, flow correction effects or speed increasing effects due to the flow correction fin can be further improved.

In the moving body side section structure according to the aspect of the present invention, in the flow correction fin, a ratio between the maximum width in the vertical direction of the moving body and the length in the longitudinal direction of the moving body in a side view of the moving body may be 8 to 17%. In the moving body side section structure, since the flow correction fin is formed so that the ratio between the maximum width in the vertical direction of the moving body and the length in the longitudinal direction of the moving body is 8 to 17%, flow correction effects or speed increasing effects due to the flow correction fin can be further improved.

In the moving body side section structure according to the aspect of the present invention, in the flow correction fin, a ratio between the maximum width in the width direction of the moving body and the length in the longitudinal direction of the moving body in a plan view of the moving body may be 5 to 15%. In the moving body side section structure, since the flow correction fin is formed so that the ratio between the maximum width in the width direction of the moving body and the length in the longitudinal direction of the moving body is 5 to 15%, flow correction effects or speed increasing effects due to the flow correction fin can be further improved.

Advantageous Effects of Invention

According to the present invention, the flow correction fin is provided on the side section of the moving body, and thereby, the flow of fluid at the upper portion of the moving body can be corrected due to effects of the flow correction fin, and stability of the moving body can be improved.

DESCRIPTION OF EMBODIMENTS

Figure 1:
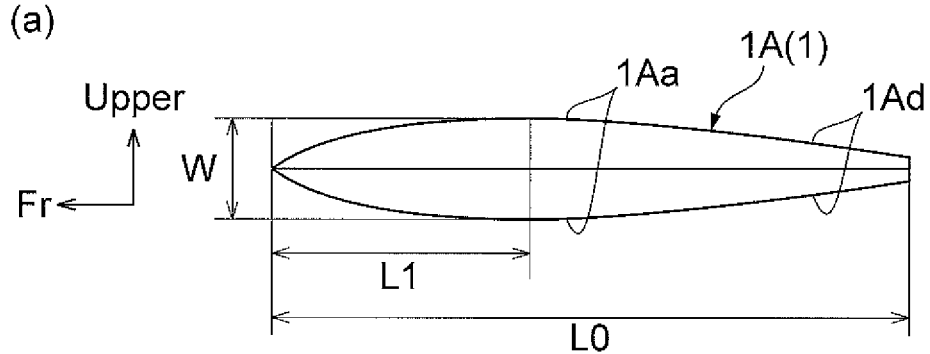
FIG. 1 is an example of a flow correction fin according to the present embodiment, (a) is a side view of a vehicle, and (b) is a plan view of the vehicle.
Figure 1:
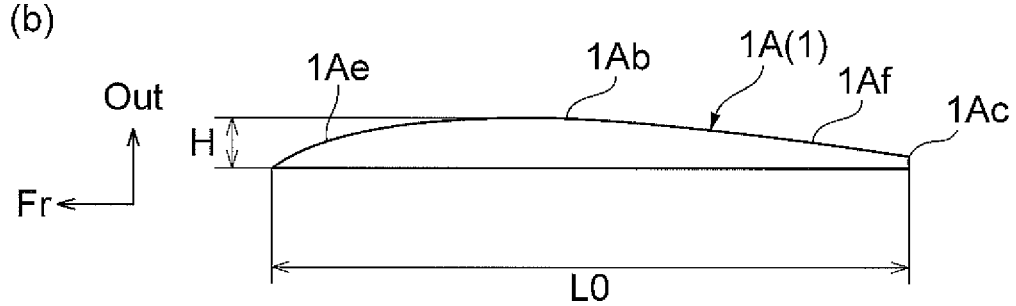

Hereinafter, with reference to drawings, an embodiment of a moving body side section structure according to the present invention will be described. Moreover, the same reference numerals are given to the same or the corresponding portions in each drawing, and overlapping descriptions thereof are omitted.

In the present embodiment, the moving body side section structure according to the present invention is applied to a vehicle side section structure of a general passenger car. In the vehicle side section structure of the present embodiment, a flow correction fin that corrects a flow of fluid (air) is provided on each portion of the side sections of a vehicle body. The vehicle body side section is positioned further upward than the bottom portion of the vehicle body and is an upper portion of the vehicle body.

Figure 2:
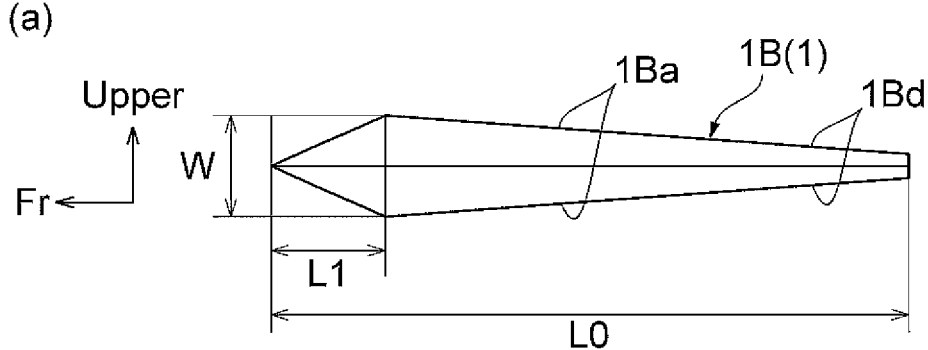
FIG. 2 is another example of the flow correction fin according to the present embodiment, (a) is a side view of a vehicle, and (b) is a plan view of the vehicle.
Figure 2:
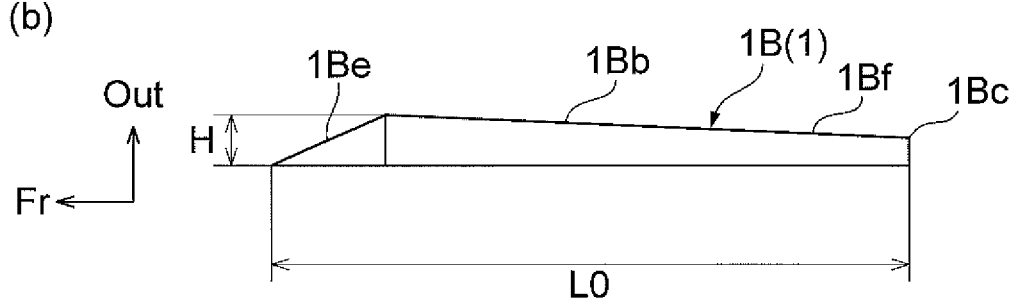
Figure 3:
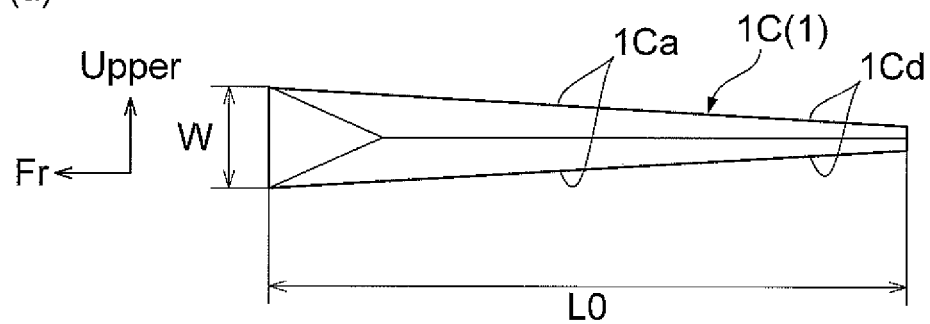
FIG. 3 is still another example of the flow correction fin according to the present embodiment, (a) is a side view of a vehicle, and (b) is a plan view of the vehicle.
Figure 3:
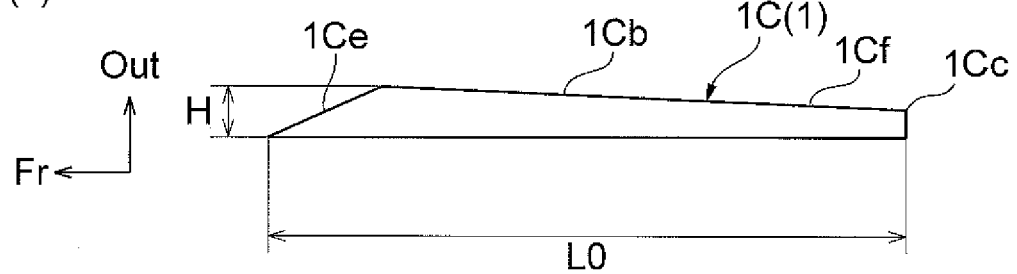

In addition, in the present embodiment, in a state where the flow correction fin is provided on the vehicle body side section, the shape of the flow correction fin in the longitudinal direction of the vehicle, the width direction of the vehicle, the vertical direction of the vehicle is described. In FIGS. 1 to 3, "Fr" is the front side in the longitudinal direction of the vehicle, "Upper" is an upper side in the vertical direction of the vehicle, and "Out" is an outer side in the width direction of the vehicle.

Figure 4:
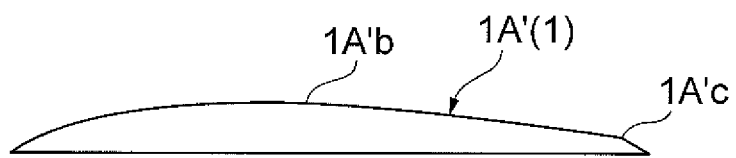
FIG. 4 is a plan view of a vehicle showing other shapes of the rear end portion of the flow correction fin according to the present embodiment, (a) is a flow correction fin in which the rear end portion of the flow correction fin of FIG. 1 is formed in another shape, (b) is a flow correction fin in which the rear end portion of the flow correction fin of FIG. 2 is formed in another shape, and (c) is a flow correction fin in which the rear end portion of the flow correction fin of FIG. 3 is formed in another shape.
Figure 4:
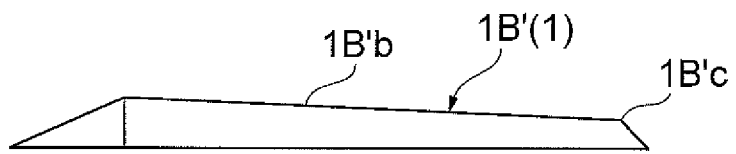
Figure 4:
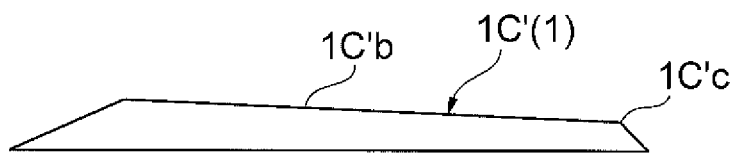

With reference to FIGS. 1 to 4, a flow correction fin 1 according to the present embodiment is described. FIG. 1 is an example of a flow correction fin according to the present embodiment. FIG. 2 is another example of a flow correction fin according to the present embodiment. FIG. 3 is still another example of a flow correction fin according to the present embodiment. FIG. 4 is a plan view of a vehicle showing other shapes of the rear end portion of the flow correction fin according to the present embodiment.

The flow correction fin 1 is provided on the vehicle body side section, corrects a flow of fluid in the vicinity of the side section, and increases the flow speed of the fluid. The flow correction fin 1 is an aerofoil fin (may also not be an aerofoil) which has a blade thickness in the vertical direction of the vehicle. The shape of the flow correction fin 1 in a side view of the vehicle is bilaterally symmetrical, the flow correction fin includes a shape (a third inclined portion) in which the width in the vertical direction of the vehicle is narrowed toward the rear side when the fin is provided on the vehicle body side section, an airflow is converged due to the third inclined portion, and thereby, the flow speed can be increased. Particularly, it is preferable that the maximum width position in the vertical direction of the vehicle be set at the front side of the vehicle. Moreover, when the flow correction fin 1 is provided on the vehicle body side section, the flow correction fin 1 includes a shape in which the length of the fin 1 in the longitudinal direction of the vehicle is longer than the length in the vertical direction of the vehicle. Moreover, when the flow correction fin 1 is provided on the vehicle body side section, the cross-sectional shape of the fin in the vertical direction of the vehicle is a triangular shape or a bell shape. In addition, the flow correction fin 1 includes a shape (a first inclined portion) which is formed at the front end portion in the longitudinal direction of the vehicle and in which the width in the width direction of the vehicle is widened toward the rear side in the longitudinal direction of the vehicle, and the airflow can be smoothly introduced along the flow correction fin due to the first inclined portion. Moreover, the flow correction fin 1 includes a shape (a second inclined portion) which is formed further rearward than the first inclined portion in the longitudinal direction of the vehicle and in which the width in the width direction of the vehicle is narrowed toward the rear side in the longitudinal direction of the vehicle, and a flow correction toward the vehicle body side can be performed due to the second inclined portion. Particularly, it is preferable that the maximum width position in the width direction of the vehicle be set at the front side of the vehicle. Moreover, the first inclined portion and the second inclined portion may be formed in a straight line, or may be formed in a curved line. In addition, the first inclined portion and the second inclined portion may be formed so as to be continuous, or may interpose a portion parallel in the longitudinal direction so as to be non-continuous.

Particularly, the flow correction fin 1 includes a ridge line (may be a straight line or a curved line) that connects the front end portion and the rear end portion to each other in the longitudinal direction of the vehicle in a plan view of the vehicle. The ridge line may be formed with an inclination which lowers rearward due to at least the second inclined portion, and may be formed with an inclination which rises from the front end due to the first inclined portion and an inclination which lowers rearward due to the second inclined portion. Moreover, the flow correction fin 1 has a shape which includes an inflection portion in which the width in the width direction of the vehicle in a plan view of the vehicle is discontinuously narrowed. The straight line or the curved line of the ridge line at the rear end portion is changed due to the inflection portion, and the rear end of the flow correction fin 1 has a shape which is steeply raised with respect to the vehicle body side surface. Due to the ridge line shape and the inflection portion described above, the rear end shape is particularly effective in improvement of flow correction effects and speed increasing effects of the flow correction fin 1.

A suitable shape that has improved flow correction effects or speed increasing effects of the flow correction fin 1 satisfies the following condition. The condition is that the maximum blade thickness ratio of the flow correction fin 1 is within a range of 8 to 17%. The maximum blade thickness ratio is the maximum blade thickness W (maximum width in the vertical direction of the vehicle)/blade chord length L0 (length in the longitudinal direction of the vehicle), and the smaller the value the narrower the fin shape becomes.

In addition, the condition is that a position of the maximum blade thickness of the flow correction fin 1 is within a range of 30 to 50%. The position of the maximum blade thickness is the length from the front end to the position of the maximum blade thickness W (length from the front end in the longitudinal direction of the vehicle to the maximum width position in the vertical direction of the vehicle) L1/the blade chord length L0, the smaller the value, the closer the maximum blade thickness is positioned to the front end side, and the sharper the shape of the rear end side.

Moreover, the condition is that a maximum height ratio of the flow correction fin 1 is within a range of 5 to 15%. The maximum height ratio is the maximum height H (a maximum width in the width direction of the vehicle)/the blade chord length L0, and the greater the height of the fin the greater the value of the maximum height ratio (the fin has a shape which protrudes outside from the vehicle body side section).

Moreover, the condition is that a radius of a crest portion of the ridge line of the flow correction fin 1 is within a range of 0 to 4.0 mm. When the radius is 0, the crest portion of the ridge line is a triangle. The curve of the crest portion of the ridge line becomes less sharp as the radius increases.

Moreover, the condition is that the angle of the crest portion of a triangular shape or a bell shape in the cross-section in the vertical direction of the vehicle of the flow correction fin 1 is within a range of 60 to 90°. The triangular shape or the bell shape of the cross-section becomes sharper as the angle decreases.

Moreover, the condition is that the angle of the shape portion steeply raised due to the inflection portion of the flow correction fin 1 with respect to the vehicle body side surface is within a range of 45 to 90°. The closer the angle to 90°, the more steeply the fin rises with respect to the vehicle body side surface, and the flow correction effects increase.

FIG. 1 shows a flow correction fin 1A as one shape example of the flow correction fin 1. The flow correction fin 1A is formed in a curved line. In the flow correction fin 1A, the width of the center portion in the longitudinal direction of the vehicle is wider than the widths of the front end side and rear end side, and the shape in a side view of the vehicle has an aerofoil shape 1Aa of a curved line (refer to FIG. 1(a)). According to the aerofoil shape 1Aa, the fin becomes a shape which includes a third inclined portion 1Ad in which the width in the vertical direction of the vehicle is gradually narrowed up to the rear end toward the rear side. Moreover, in the flow correction fin 1A, the height of the center portion in the longitudinal direction of the vehicle is higher than the heights of the front end side and rear end side, and the fin includes a ridge line 1Ab of a curved line (refer to FIG. 1(b)). The ridge line 1Ab is formed so as to include a first inclined portion 1Ae in which the width in the width direction of the vehicle is gradually widened from the front end toward the rear side and a second inclined portion 1Af which is continuous to the first inclined portion and in which the width in the width direction of the vehicle is gradually narrowed up to the rear end toward the rear side. Moreover, in the flow correction fin 1A, the cross-section in the vertical direction of the vehicle is a bell shape. In addition, the flow correction fin 1A includes an inflection portion 1Ac, the inflection portion 1Ac becomes an inflection point in which the ridge line 1Ab of the curved line is cut, and the angle of the rear end with respect to the vehicle body side surface is 90° when the flow correction fin 1A is provided on the vehicle body side section (refer to FIG. 1(b)).

FIG. 2 shows a flow correction fin 1B which is another shape example of the flow correction fin 1. The flow correction fin 1B is formed in a straight line. In the flow correction fin 1B, the width of the center portion in the longitudinal direction of the vehicle is wider than the widths of the front end side and rear end side, and the shape in a side view of the vehicle has an aerofoil shape 1Ba of a straight line (refer to FIG. 2(a)). According to the aerofoil shape 1Ba, the fin becomes a shape which includes a third inclined portion 1Bd in which the width in the vertical direction of the vehicle is gradually narrowed up to the rear end toward the rear side. Moreover, in the flow correction fin 1B, the height of the center portion in the longitudinal direction of the vehicle is higher than the heights of the front end side and rear end side, and the fin includes a ridge line 1Bb of a straight line (refer to FIG. 2(b)). The ridge line 1Bb is formed so as to include a first inclined portion 1Be in which the width in the width direction of the vehicle is gradually widened from the front end toward the rear side and a second inclined portion 1Bf which is continuous to the first inclined portion and in which the width in the width direction of the vehicle is gradually narrowed up to the rear end toward the rear side. Moreover, in the flow correction fin 1B, the cross-section in the vertical direction of the vehicle is a triangular shape. Moreover, the flow correction fin 1B includes an inflection portion 1Bc similar to that of the flow correction fin 1A.

FIG. 3 shows a flow correction fin 1C which is still another shape example of the flow correction fin 1. The flow correction fin 1C is formed in a straight line. In the flow correction fin 1C, the width is gradually narrowed from the front end toward the rear end, and the shape in a side view of the vehicle has a trapezoid shape 1Ca (refer to FIG. 3(a)). According to the trapezoid shape 1Ca, the fin becomes a shape which includes a third inclined portion 1Cd in which the width in the vertical direction of the vehicle is gradually narrowed from the front end up to the rear end toward the rear side. Therefore, the position of the maximum blade thickness W is the front end. Moreover, in the flow correction fin 1C, the height of the center portion in the longitudinal direction of the vehicle is higher than the heights of the front end side and rear end side, and the fin includes a ridge line 1Cb of a straight line (refer to FIG. 3(b)). The ridge line 1Cb includes only a second inclined portion 1Cf in which the width in the width direction of the vehicle is gradually narrowed up to the rear end toward the rear side. A first inclined portion 1Ce in which the width in the width direction of the vehicle is gradually widened from the front end toward the rear side is present at the front side of the second inclined portion 1Cf. Moreover, the cross-section in the vehicle vertical direction of the flow correction fin 1C is triangular. In addition, the flow correction fin 1C includes an inflection portion 1Cc similar to that of the flow correction fin 1A.

FIG. 4 shows flow correction fins 1A', 1B', and 1C' which have other shapes of the rear end portions with respect to the flow correction fins 1A, 1B, and 1C of FIGS. 1 to 3. Unlike each of the inflection portions 1Ac, 1Bc, and 1Cc of the flow correction fins 1A, 1B, and 1C, each of inflection portions 1A'c, 1B'c, and 1C'c of the flow correction fins 1A', 1B', and 1C' is not an inflection point such as the cut ridge line but an inflection point in which angles of the ridge lines 1A'b, 1B'b, and 1C'b are changed. Therefore, when the flow correction fins 1A', 1B', and 1C' are provided on the vehicle body side section, the angle of the rear end with respect to the vehicle body side surface becomes a predetermined angle which is smaller than 90°. The predetermined angle is set so as to be 45° or more.

If the flow correction fin 1 having the above-described shapes receives fluid having a predetermined flow speed from the front side, a longitudinal vortex which is adjusted rearward from the rear end of the flow correction fin 1 is generated, and the flow speed in the rear side becomes faster than the received flow speed. Moreover, the flow of the fluid is drawn into the flow correction fin 1, and the flow speed at a position just near the flow correction fin 1 becomes faster than the received flow speed. These effects are demonstrated in a single body flow speed test in which air having a constant flow speed is blown from the front side in a case where the flow correction fin 1 is not present and in a case where the flow correction fin is present (refer to Example described below), and a constant flow speed is equally distributed in the case where the flow correction fin 1 is not present. However, in the case where the flow correction fin 1 is present, the flow speed is increased at the rear side of the flow correction fin 1, and the flow speed at the position just near the flow correction fin 1 is increased.

Figure 5:
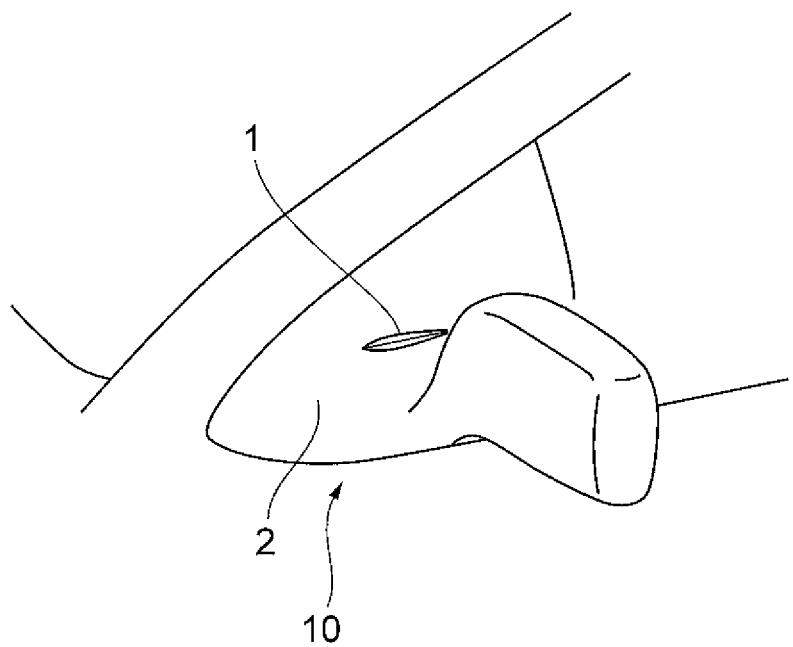
FIG. 5 is examples of vehicle side section structures in which the flow correction fin according to the present embodiment is provided on a vehicle body side section, (a) is a case where the flow correction fin is provided on a door mirror base, and (b) is a case where the flow correction fin is provided on a rear combination lamp.
Figure 5:
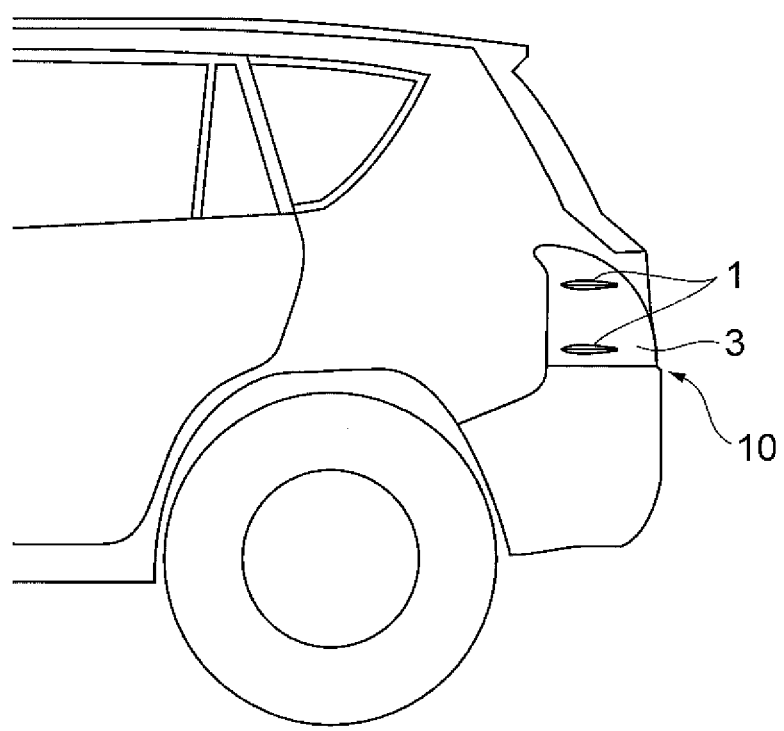

With reference to FIG. 5, a vehicle side section structure 10 according to the present embodiment will be described. FIG. 5 is an example of the vehicle side section structure in which the flow correction fin according to the present embodiment is provided on the vehicle body side section.

In the vehicle side section structure 10, the above-described flow correction fin 1 is provided on a portion (a portion in which the flow is stable and the flow speed is fast) in which flow correction effects or speed increasing effects of the flow correction fin 1 are attained. In the case where the flow correction fin 1 is provided, the flow correction fin 1 may be integrally formed on each portion of the vehicle body, or the flow correction fin 1 is separately manufactured and may be mounted on each portion of the vehicle body. Moreover, in the case where the flow correction fin 1 is provided, the flow correction fins are provided on positions in which each portion of the side sections of the vehicle body is laterally symmetrical respectively, and one fin or a plurality of fins may be provided. In addition, in the case where the flow correction fin 1 is provided, only one fin or a plurality of fins may be provided on the same portion of the vehicle body side section. For example, as the portion in which effects of the flow correction fin 1 are attained, there are a portion (a door mirror base and the like) of a vehicle body side section in which the flow correction fin 1 is disposed between the door mirror and the vehicle body side section, a portion (a rear combination lamp and the like) in the vicinity of the vehicle body rear end, and a fender side marker signal.

FIG. 5(*a*) shows the vehicle side section structure 10 in which one flow correction fin 1 is provided on the door mirror base 2. In this case, the flow correction fin 1 may be formed on the door mirror base 2 which is a resin part, or a separated flow correction fin 1 may be mounted on the door mirror base 2. When the flow correction fin 1 is provided on the door mirror base 2, the fluid in the vicinity of pillar A is corrected due to the flow correction fin 1, and the flow speed can be increased. As a result, steering performance or the like can be improved. In addition, in a case where the door mirror is directly mounted on the door and the door mirror base is not present, the flow correction fin 1 may be formed on a triangular patch when the triangular patch of the resin part is present, and a separated flow correction fin 1 may be adhered to the glass (a triangular shape portion or the like) of a window when the triangular patch is not present.

FIG. 5(*b*) shows the vehicle side section structure 10 in which two flow correction fins 1 are provided on the rear combination lamp 3. In this case, two flow correction fins 1 may be formed on a cover of the rear combination lamp 3 so as to be vertically parallel to each other, or separated two flow correction fins 1 may be mounted on the rear combination lamp 3 so as to be parallel to each other. When the flow correction fin 1 is provided on the rear combination lamp 3, the flow of the fluid is corrected in the rear end (an airflow discharging portion in the vicinity of the vehicle body) of the vehicle, convergence of the airflow can be promoted, and the flow speed can be increased. As a result, rear stability performance or the like can be improved. Moreover, when the flow correction fin 1 is provided on the rear combination lamp 3, only one large flow correction fin 1 may be provided, three small flow correction fins 1 may be provided, and a plurality of flow correction fins 1 which have different sizes according to the shape of the rear combination lamp 3 may be provided.

According to the vehicle side section structure 10, due to the effects of the flow correction fin 1 during the traveling of the vehicle, a strong longitudinal vortex which is adjusted from the rear end portion of the flow correction fin 1 is generated, and a fluid flow can be corrected (the fluid flow becomes smooth). Moreover, the flow speed in the vicinity of the vehicle body can be increased (particularly, a speed increase at the rear side of the flow correction fin 1 or the vicinity thereof), the mainstream (the fastest flow of the fluid) can be closer to the vehicle body compared to a structure in which the flow correction fin 1 is not present. Thereby, an air wall having a fast flow is generated at the vicinity of the vehicle body, and pressure (aerodynamic force) to the vehicle body is increased. As a result, even when various inputs (a road surface input, an input due to steering, an input due to a steady wind during traveling of the vehicle, an input due to a side wind, or the like) are applied to the vehicle, vehicle stability (straight traveling stability, yaw responsiveness, steering response, effectiveness of stability, stability (control stability), a feeling of rear grip, a feeling of rolling, a feeling of flat, and the like) is improved, and air resistance is also decreased. In addition, according to the vehicle side section structure 10, the flow correction fin 1 is provided on the vehicle body side section, and thereby, the vehicle body is not subjected to influence due to the side wind, flow correction effects can be exhibited, and vehicle stability can be further improved.

Particularly, since the flow correction fin 1 includes the ridge line which connects the front end portion and the rear end portion, flow correction effects or speed increasing effects due to the flow correction fin 1 are improved. Moreover, the inflection portion is provided at the rear end portion of the flow correction fin 1 and the inflection portion has a shape which is steeply raised with respect to the vehicle body side surface, flow correction effects or speed increasing effects due to the flow correction fin 1 are improved. In addition, since the maximum blade thickness ratio of the flow correction fin 1 is within the range of 8 to 17%, the position of the maximum blade thickness is within the range of 30 to 50%, and the maximum height ratio is within the range of 5 to 15%, flow correction effects or speed increasing effects due to the flow correction fin 1 are improved.

Moreover, since the flow correction fin 1 is provided on the portion (door mirror base and the like) between the side mirror and the vehicle body or the rear end portion (rear combination lamp and the like) of the vehicle, the effects due to the flow correction fin 1 can be obtained.

As described above, the embodiments according to the present invention are described. However, the present invention is not limited to the above-described embodiments and is embodied in various shapes.

For example, in the present embodiments, the moving body side section structure is applied to a general passenger car. However, the moving body side section structure can be applied to various vehicles (for example, sports cars, minivans, trucks, and buses), or can be also applied to other moving bodies such as airplanes, two-wheeled vehicles, and bicycles.

Moreover, in the present embodiments, as examples of the portion of the vehicle body side section on which the flow correction fin is provided, a side section portion between the door mirror and the vehicle body, the rear end portion of the vehicle, and the fender side marker signal are mentioned. However, the flow correction fin may be provided on portions of other vehicle body side sections such as doors or fenders.

Moreover, in the present embodiments, one or two flow correction fins are configured so as to be provided on each portion. However, the number of flow correction fins is not particularly limited, and three or more flow correction fins may be provided on the same portion. When a plurality of flow correction fins are provided, the flow correction fins having all the same size may be provided, and the flow correction fins having different sizes according to the shape or the like of the provided portion may be provided. Moreover, the size of the flow correction fin for each one may be gradually decreased as the number of the flow correction fins that are provided on the same portion is increased. In addition, when a plurality of flow correction fins are disposed so as to be vertically parallel, it is preferable that the flow correction fins be vertically disposed with intervals of an extent of the length of the flow correction fin in the longitudinal direction of the vehicle.

Moreover, in the present embodiments, six examples of the shape of the flow correction fin are illustrated. However, the flow correction fin may be formed in other shapes. For example, the flow correction fin may not be bilaterally symmetrical. In the present embodiments, the flow correction fin includes the ridge line. However, the ridge line may not be formed. Moreover, in the present embodiments, the flow correction fin includes the inflection portion. However, the inflection portion may not be formed.

In addition, in the present embodiments, as the suitable shape so as to have improved effects due to the flow correction fin, six condition ranges are illustrated. Here, it is most preferable that the flow correction fin be formed in a shape which satisfies the all six condition ranges. However, the flow correction fin may be formed in a shape which satisfies some condition ranges among the six condition ranges, or even when all condition ranges are not satisfied, if the flow correction fin has a basic shape of a flow correction fin and has a shape by which the flow correction effects or speed increasing effects can be obtained, any flow correction fin may be applied.

EXAMPLES

Next, Examples of the present invention will be described. Moreover, the present invention is not limited to the Examples.

(Flow Speed Change Test)

Figure 6:
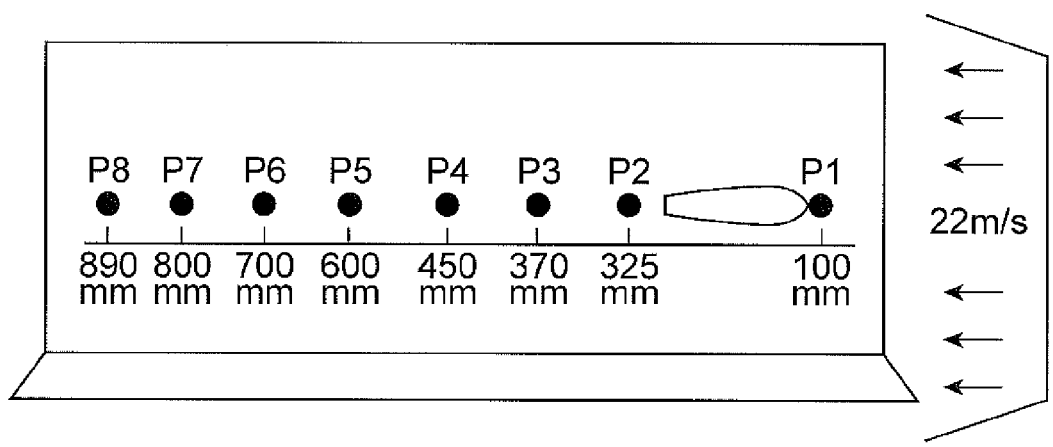
FIG. 6 is a view showing a state of a flow speed change test.
Figure 7:
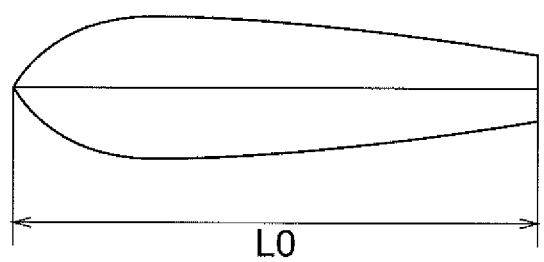
FIG. 7 is a view showing shapes of flow correction fins that is used in Example.
Figure 7:
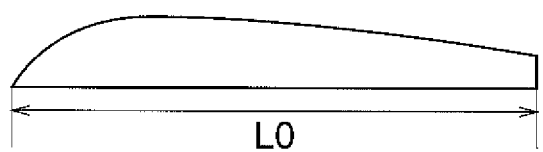

A flow speed change test was performed in which a flow speed change when the flow correction fin was present and a flow speed change when the flow correction fin was not present were measured. Hereinafter, the flow speed change test will be explained in detail with reference to FIGS. 6 and 7. FIG. 6 is a view showing the state of the flow speed change test. FIG. 7 is a view showing shapes of flow correction fins used in Examples. In addition, in FIG. 7, (a) is a side view of the flow correction fin, and (b) is a plan view of the flow correction fin.

First, as shown in FIG. 6, a wall surface on which a plurality of measurement points, at which the flow speed of an airstream was measured, were installed was prepared. These measurement points were configured of a measurement point P1 that was positioned 100 mm away from the front end of the wall surface, a measurement point P2 that was positioned 325 mm away from the front end of the wall surface, a measurement point P3 that was positioned 370 mm away from the front end of the wall surface, a measurement point P4 that was positioned 450 mm away from the front end of the wall surface, a measurement point P5 that was positioned 600 mm away from the front end of the wall surface, a measurement point P6 that was positioned 700 mm away from the front end of the wall surface, a measurement point P7 that was positioned 800 mm away from the front end of the wall surface, and a measurement point P8 that was positioned 890 mm away from the front end of the wall surface.

Next, the flow correction fin shown in FIG. 7 was prepared. In the flow correction fin, the shape in a side view was an aerofoil shape of a curved line, and the blade chord length L0 was 110 mm.

Next, the flow correction fin was mounted on the wall surface so that the front end of the flow correction fin was disposed at the measurement point P1. Thereby, the measurement point P1 was disposed at the front end of the flow correction fin, and the measurement points P2 to P8 were disposed rearward of the flow correction fin. Moreover, the flow correction fin and each of the measurement points P1 to P8 were disposed on the same horizontal surface.

In addition, an airstream having a wind speed of 22 m/s was blown to the wall surface, and the flow speed of the airstream at each of the measurement points was measured. The measured results are shown in the "Present" row of Table 1.

Next, the flow correction fin was removed from the wall surface, the airstream having a wind speed of 22 m/s was blown to the wall surface, and the flow speed of the airstream at each of the measurement points was measured. The measured results are shown in the "Not Present" row of Table 1.

TABLE 1

| Flow Correction Fin | P1 | P2 | P3 | P4 | P5 | P6 | P7 | P8 (m/s) |
|---|---|---|---|---|---|---|---|---|
| Present | 22.0 | 26.0 | 26.3 | 26.0 | 25.5 | 25.0 | 24.6 | 24.6 |
| Not Present | 22.0 | 22.0 | 22.1 | 22.0 | 22.0 | 22.0 | 22.0 | 22.0 |

As is evident from Table 1, when the flow correction fin was not present, the flow speed was almost unchanged, and a constant flow speed was equally distributed. However, when the flow correction fin was present, it was demonstrated that the flow speed was increased at the rear side of the flow correction fin.

(Inspection of Differences in Effect Due to Differences in Shape)

Next, in order to inspect differences in the effect due to differences in the shape, flow correction fins of Examples 1 to 7 and Comparative Example 1 were prepared.

In the flow correction fin of Example 1, the shape in side view was formed in an aerofoil shape of a curved line (refer to Table 2 below). Moreover, a plan view of the flow correction fin is shown in the shape column of Example 1 in Table 2. The flow correction fin included the first inclined portion, the second inclined portion, the third inclined portion, the ridge line, and the inflection portion. Moreover, the blade chord length L0 of the flow correction fin was set to 55 mm.

In the flow correction fin of Example 2, the shape in a side view was formed in an aerofoil shape of a straight line (refer to Table 2 below). Moreover, a plan view of the flow correction fin is shown in a column of the shape of Example 2 in Table 2. The flow correction fin included the first inclined portion, the second inclined portion, the third inclined portion, the ridge line, and the inflection portion. Moreover, the blade chord length L0 of the flow correction fin was set to 150 mm.

In the flow correction fin of Example 3, the shape in a side view was formed in an aerofoil shape of a straight line (refer to Table 2 below). Moreover, a plan view of the flow correction fin is shown in a column of the shape of Example 3 in Table 2. The flow correction fin included the first inclined portion, the second inclined portion, the third inclined portion, and the ridge line, and did not include the inflection portion. Moreover, the blade chord length L0 of the flow correction fin was set to 150 mm.

In the flow correction fin of Example 4, the shape in a side view was formed in an aerofoil shape of a curved line (refer to Table 2 below). Moreover, a side view of the flow correction fin is shown in a column of the shape of Example 4 in Table 2. The flow correction fin included the first inclined portion, the second inclined portion, and the third inclined portion, and did not include the ridge line and the inflection portion.

In the flow correction fin of Example 5, the cross-section in the vertical direction was formed in a triangular shape (refer to Table 2 below). Moreover, a cross-sectional view of the flow correction fin is shown in the shape column of Example 5 in Table 2. The flow correction fin included the first inclined portion, the second inclined portion, the third inclined portion, the ridge line, and the inflection portion. In addition, the flow correction fin was formed in an aerofoil shape, and a vertical angle (hereinafter, referred to as a "clay vertical angle") of the tip (front end) in the side view was set to 120°. Moreover, the blade chord length L0 of the flow correction fin was set to 150 mm.

In the flow correction fin of Example 6, the cross-section in the vertical direction was formed in a triangular shape (refer to Table 2 below). Moreover, a cross-sectional view of the flow correction fin is shown in a column of the shape of Example 6 in Table 2. The flow correction fin included the first inclined portion, the second inclined portion, the third inclined portion, the ridge line, and the inflection portion. In addition, the flow correction fin was formed in an aerofoil shape, and the clay vertical angle was set to 120°. Moreover, the blade chord length L0 of the flow correction fin was set to 150 mm.

In the flow correction fin of Example 7, the cross-section in the vertical direction was formed in a triangular shape (refer to Table 2 below). Moreover, a cross-sectional view of the flow correction fin is shown in a column of the shape of Example 7 in Table 2. The flow correction fin included the first inclined portion, the second inclined portion, the third inclined portion, the ridge line, and the inflection portion. In addition, the flow correction fin was formed in an aerofoil shape, and the clay vertical angle was set to 120°. Moreover, the blade chord length L0 of the flow correction fin was set to 150 mm.

In the flow correction fin of Comparative Example 1, the shape in a side view was formed in an aerofoil shape of a curved line (refer to Table 2 below). Moreover, a plan view of the flow correction fin is shown in the shape column of Comparative Example 1 in Table 2. The flow correction fin included the first inclined portion, the third inclined portion, the ridge line, and the inflection portion, and did not include the second inclined portion.

Next, as similar to the above-described flow speed change test, the flow correction fins of Examples 1 to 7 and Comparative Example 1 were mounted on the wall surface, and an airstream having a wind speed of 22 m/s was blown to the wall surface. Moreover, the flow speed of the airstream at the tip and the rear end of each of the flow correction fins was measured, and the increase ratio of the flow speed of the airstream at the rear end with respect to the flow speed of the airstream at the front end was measured. The measured results are shown in Table 2.

Moreover, the position (distance from the wall surface to the mainstream of the airstream) of the mainstream (the strongest and fastest flow) of the airstream with respect to the wall surface was measured as the boundary layer position. The measured results are shown in Table 2.

TABLE 2

| | Shape | Flow Speed at Front End (m/s) | Flow Speed at Rear End (m/s) | Increase Ratio | Boundary Layer Position (mm) |
|---|---|---|---|---|---|
| Example 1 | | 21.9 | 26.9 | 23% | 2.2 |
| Example 2 | | 22.4 | 25.8 | 21% | 10.0 |
| Example 3 | | 22.1 | 26.0 | 18% | 16.0 |
| Example 4 | | 21.7 | 23.3 | 7% | 8.5 |
| Example 5 | R = 0.1 | 21.8 | 25.8 | 18% | 15.0 |
| Example 6 | R = 2.75 | 22.0 | 26.0 | 18% | 14.0 |
| Example 7 | R = 5.0 | 21.8 | 25.9 | 19% | 11.0 |
| Comparative Example 1 | | | | | 22.0 |

Here, with reference to the measured results of Table 2, Examples 1 and 2 that include the second inclined portion and Comparative Example 1 that does not include the second inclined portion are compared to each other. Thereby, each of the boundary layer positions of Examples 1 and 2 is 2.2 mm and 10.0 mm while the boundary layer position of Comparative Example 1 is 22.0 mm.

As the result of these comparisons, compared to the case where the flow correction fin of Comparative Example which did not include the second inclined portion was used, since the flow correction fins of the Examples which included the second inclined portion were used, it was demonstrated that the mainstream of the airstream was closer to the moving body (wall surface).

In addition, Examples 1 and 2 that include the inflection portion and Example 3 that does not include the inflection portion are compared to each other. Thereby, each of the increase ratios of Examples 1 and 2 is 23% and 21% while the increase ratio of Example 3 is 18%. In addition, each of the boundary layer positions of Examples 1 and 2 is 2.2 mm and 10.0 mm while the boundary layer position of Example 3 is 16.0 mm As these comparison results, compared to the case of the flow correction fin which did not include the inflection portion, since the flow correction fin which included the first inclined portion and second inclined portion included the inflection portion, it was demonstrated that the speed of the airstream was increased and the mainstream of the airstream was closer to the moving body (wall surface).

In addition, Examples 1 and 2 that include the ridge line and Example 4 that does not include the ridge line are compared to each other. Thereby, each of the increase ratios of Examples 1 and 2 is 23% and 21% while the increase ratio of Example 4 is 7%.

As these comparison results, compared to the case of the flow correction fin which did not include the ridge line, since the flow correction fin which included the first inclined portion and second inclined portion included the ridge line, it was demonstrated that the speed of the airstream was increased.

Moreover, Examples 5 to 8 in which the radii of the ridge lines are different from one another are compared. Thereby, the increase ratios of Examples 5 and 6 in which each of the radii of the ridge lines is 0.1 mm and 2.75 mm are 18%, and the increase ratio of Example 7 in which the radius of the ridge line is 5.0 mm are 19%. Moreover, the boundary layer position of Examples 5 in which the radius of the ridge line is 0.1 mm is 15.0 mm, the boundary layer position of Example 6 in which the radius of the ridge line is 2.75 mm is 14M mm, and the boundary layer position of Example 7 in which the radius of the ridge line is 5.0 mm is 11.0 mm.

As these comparison results, in the flow correction fins which included the first inclined portion, the second inclined portion, and the ridge line, compared to the flow correction fin having the ridge line of a smaller radius, in the flow correction fin having the ridge line of a larger radius, it was demonstrated that the speed of the airstream was increased and the mainstream of the airstream was closer to the moving body (wall surface). Specifically, compared to the case where the radius of the ridge line was set to 0.1 mm, when the radius of the ridge line was set to 2.75 mm to 5.0 mm, it was demonstrated that the speed of the airstream was increased and the mainstream of the airstream was closer to the moving body (wall surface).

INDUSTRIAL APPLICABILITY

The moving body side section structure of the present invention can be used as a moving body side section structure that is provided on the side section of a moving body.

REFERENCE SIGNS LIST 1, 1A, 1A', 1B, 1B', 1C, and 1C': flow correction fin
1Aa and 1Ba: aerofoil shape
1Ca: trapezoid shape
1Ab, 1Bb, 1Cb, 1A'b, 1B'b, and 1C'b: ridge line
1Ac, 1Bc, 1Cc, 1A'c, 1B'c, and 1C'c: inflection point
1Ad, 1Bd, and 1Cd: third inclined portion
1Ae, 1Be, and 1Ce: first inclined portion
1Af, 1Bf, and 1Cf: second inclined portion
2: door mirror base
3: rear combination lamp
10: vehicle side section structure

The invention claimed is:

1. A moving body side section structure that includes a flow correction fin that is provided on a side section of a moving body and corrects a flow of fluid of the side section of the moving body,
wherein the moving body is a vehicle,
the flow correction fin is provided on a portion of a side section of a vehicle body between a side mirror and the vehicle body in the vehicle width direction and the length of the flow correction fin in a longitudinal direction of the moving body is set so as to be longer than the length of the fin in a vertical direction of the moving body,
the flow correction fin includes:
a first inclined portion which is formed at a front end portion in the longitudinal direction of the moving body and in which a width in a width direction of the moving body is widened toward a rear side in the longitudinal direction of the moving body; and
a second inclined portion which is formed further rearward than the first inclined portion in the longitudinal direction of the moving body and in which the width in the width direction of the moving body is narrowed toward the rear side in the longitudinal direction of the moving body.

2. The moving body side section structure according to claim 1,
wherein the flow correction fin includes a ridge line that connects a front end portion and a rear end portion in the longitudinal direction of the moving body.

3. The moving body side section structure according to claim 1,
wherein the flow correction fin includes a third inclined portion in which the width in the vertical direction of the moving body is narrowed toward the rear side in the longitudinal direction of the moving body.

4. The moving body side section structure according to claim 1,
wherein an inflection portion that is formed so as to be steeply raised with respect to a side surface of the moving body in a plan view of the moving body is set at the rear end portion of the flow correction fin.

5. The moving body side section structure according to claim 1,
wherein in the flow correction fin, a maximum width position in the vertical direction of the moving body and the width direction of the moving body is set at a front side of the moving body.

6. The moving body side section structure according to claim 1,
wherein in the flow correction fin, a ratio between a length from the front end in the longitudinal direction of the moving body to the maximum width position in the vertical direction of the moving body and a length in the longitudinal direction of the moving body in a side view of the moving body is 30 to 50%.

7. The moving body side section structure according to claim 1,
wherein in the flow correction fin, a ratio between the maximum width in the vertical direction of the moving body and the length in the longitudinal direction of the moving body in a side view of the moving body is 8 to 17%.

8. The moving body side section structure according to claim 1, wherein in the flow correction fin, a ratio between the maximum width in the width direction of the moving body and the length in the longitudinal direction of the moving body in a plan view of the moving body is 5 to 15%.

9. The moving body side section structure according to claim 2, wherein a radius of the ridge line is 0 to 4.0 mm.

* * * * *